US008111897B2

(12) United States Patent
Yamashita et al.

(10) Patent No.: US 8,111,897 B2
(45) Date of Patent: Feb. 7, 2012

(54) EVALUATION SYSTEM, EVALUATION METHOD, AND RECORDING MEDIUM

(75) Inventors: Yoshiko Yamashita, Minato-ku (JP); Kenji Okajima, Minato-ku (JP); Akira Saito, Minato-ku (JP)

(73) Assignee: Nec Corporation, Tokyo (JP)

( * ) Notice: Subject to any disclaimer, the term of this patent is extended or adjusted under 35 U.S.C. 154(b) by 731 days.

(21) Appl. No.: 12/265,394

(22) Filed: Nov. 5, 2008

(65) Prior Publication Data

US 2009/0116724 A1 May 7, 2009

(30) Foreign Application Priority Data

Nov. 6, 2007 (JP) ................................. 2007-288564

(51) Int. Cl.
*G06K 9/00* (2006.01)
(52) U.S. Cl. ...................................................... 382/133
(58) Field of Classification Search ........................ None
See application file for complete search history.

(56) References Cited

U.S. PATENT DOCUMENTS

| 6,165,734 | A | * | 12/2000 | Garini et al. ................. 435/7.21 |
| 7,250,305 | B2 | * | 7/2007 | Cosenza et al. .................. 436/86 |
| 2002/0045267 | A1 | * | 4/2002 | Tsuchiya et al. ................. 436/86 |
| 2007/0111317 | A1 | * | 5/2007 | Cosenza et al. .................. 436/86 |
| 2008/0046190 | A1 | * | 2/2008 | Rimm et al. ..................... 382/133 |
| 2009/0042238 | A1 | * | 2/2009 | Sakurai et al. .................... 435/29 |
| 2011/0070598 | A1 | * | 3/2011 | Lorence et al. ............... 435/7.23 |

FOREIGN PATENT DOCUMENTS

| JP | 2004-157053 A | 6/2004 |
| JP | 2005-527781 A | 9/2005 |
| JP | 2006-325567 A | 12/2006 |
| WO | 03/016867 A2 | 2/2003 |

OTHER PUBLICATIONS

Yutaka Hatanaka, et al., "Quantitative immunohistochemical evaluation of HER2/neu expression with HercepTest™ in breast carcinoma by image analysis", Pathology International, 2001, pp. 33-36, vol. 51.

* cited by examiner

*Primary Examiner* — Jermele M Hollington
(74) *Attorney, Agent, or Firm* — Sughrue Mion, PLLC

(57) ABSTRACT

An evaluation system includes a capture unit for capturing an image of a living tissue in which HER2 protein and cell nucleuses are dyed, a discrimination unit for identifying a cell membrane from the image of the living tissue based on dyed cell nucleuses within the image of the living tissue captured by the capture unit to discriminate a dyed state of the cell membrane, and an evaluation unit for evaluating development of the HER2 protein based on a discrimination result by the discrimination unit.

17 Claims, 7 Drawing Sheets

3 a CENTER OF NUCLEUS
3 b REGION SURROUNDING CELL NUCLEUS

DEGREE OF DYEING "STRONG"
DEGREE OF DYEING "WEAK"
NOT DYED

EVALUATION SYSTEM, EVALUATION METHOD, AND RECORDING MEDIUM

This application is based upon and claims the benefit of priority from Japanese patent application No. 2007-288564, filed on Nov. 6, 2007, the disclosure of which is incorporated herein in its entirety by reference.

BACKGROUND OF THE INVENTION

1. Field of the Invention

The present invention relates to an evaluation system, an evaluation method, and an evaluation program for evaluating HER2 protein development by analyzing and processing HER2 protein immunohistochemical staining pathological image data.

2. Description of the Related Art

HER2 (Human Epidermal Growth Factor Receptor Type 2) is an oncogene which exists in the 17-th chromosome length arm.

Cancer is more susceptible to metastasis and return when amplification of HER2 gene is recognized, or excessive development of HER2 protein coded by HER2 gene is recognized. In this event, it is said that the prognosis is bad. Accordingly, the determination of HER2 is very important.

It has been reported that the excessive development of HER2 gene or HER2 protein occurs in breast cancer of human patients. It has been further known that the excessive development of HER2 gene or HER2 protein occurs in bladder cancer and ovarian cancer except for breast cancer.

HER2 testing methods include the immunohistochemistry staining method (IHC method) which determines whether or not excessive development of HER2 protein has occurred, and a method of evaluating the amplification of HER2 gene (FISH method: fluorescence in situ hybridization).

The IHC method is currently most widely used in HER testing. The IHC method is an approach which detects a target protein which localizes within cells and tissues by utilizing a peculiar coupling reaction of an antigen-antibody reaction. A coloring matrix, which is called DAB (diaminobenzidine) for dyeing HER2 protein into brown, is used to dye immunity substance.

In many IHC methods, HER2 protein is caused to develop color by DAB, and the nucleus is dyed into blue by hematoxylin.

HER2 protein localizes in cell membranes of cancer cells. Therefore, when the HER2 test is conducted, cell membranes are dyed in positive cells.

Then, the score is evaluated at four levels of "0," "1+," "2+," and "3+" according to its chromaticity.

Scores "0" and "1+" are called negative, while scores "2+" and "3+" are called positive. A portion that is subjected to determination of Her2 status is an invasion portion. The chromaticity of breast-intraductal extension and cytoplasm is not evaluated.

The diagnosis on the HER2 test is performed according to the following procedure.

First, an HE dye (hematoxylin eosin dye) sample of a tissue slice is observed using a microscope to perform a tumor diagnosis.

Also, a tissue slice adjacent to an HE dyed tissue slice is dyed by immunohistochemistry using an antibody of HER2 to derive a tissue slice sample.

This tissue slice sample is matched with a portion within the HE dyed sample which has been determined as a tumor portion. This matching identifies a tumor portion within the tissue slice sample which has been dyed according to immunohistochemistry.

Subsequently, the tumor portion is observed using a microscope.

This pathological test is one of the approaches generally conducted in current medical institutions.

In recent years, automatic dyeing machines are pervasive for dyeing a tissue slice. Thus, the number of pathological tests has been increased. On the other hand, the number of pathologists who conduct the pathological tests is overwhelmingly smaller.

In the HER2 test, a pathologist visually determines and evaluates the development of dyed positive cells through microscope observation. Accordingly, the determination result, i.e., results based on the evaluation of the HER2 test cannot be reproduced, the test lacks objectivity, and is semi-quantitative.

Also, even in the event of employing a system for displaying image information of a slide on a display, the evaluation and determination are visually performed by a pathologist. Accordingly, the results based on the evaluation of the HER2 test cannot be reproduced, the test lacks objectivity, and is semi-quantitative.

Non-Patent Document 1 (Yutaka Hatanaka, Kaoru Hashizume et al., Quantitative immunohistochemical evaluation of HER2/neu expression with HercepTest™ in breast carcinoma by image analysis, Pathology International, 2001, vol. 51, pp. 33-36) describes a measurement method which involves reading a microscopic image, quantifying HER2 protein deposits, the immunity tissue of which has been chemically dyed, and making an image analysis.

In this method, the quantification is performed using the ratio of an area dyed in brown to an area dyed in blue.

The pathologist visually evaluates and determines the development of dyed positive cells in a microscopic observation. Accordingly, the results of the HER2 test, determined by the pathologist, cannot be reproduced, the test lacks objectivity and are semi-quantitative.

In the method described in Non-Patent Document 1, quantification is performed using the ratio of an area dyed in brown to an area dyed in blue.

However, the HER2 determination involves determining the chromaticity of cell membranes. Therefore, even if a region dyed in blue by hematoxylin is evaluated, HER2 determination cannot be properly accomplished. Also, the evaluation is also made on portions dyed in brown, except for cell membranes in which HER2 protein develops, disadvantageously leading to erroneous evaluations.

SUMMARY OF THE INVENTION

An exemplary object of the present invention is to provide an evaluation system, an evaluation method, and an evaluation program which solve the problems mentioned above.

An evaluation system according to an exemplary aspect of the invention includes a capture unit for capturing an image of a living tissue in which the HER2 protein and cell nucleuses are dyed, a discrimination unit for identifying a cell membrane from the image of the living tissue based on dyed cell nucleuses within the image of the living tissue captured by the capture unit, and discriminating a dyed state of the cell membrane, and an evaluation unit for evaluating development of the HER2 protein based on a discrimination result by the discrimination unit.

An evaluation method according to an exemplary aspect of the invention includes capturing an image of a living tissue in which the HER2 protein and cell nucleuses are dyed, discriminating a dyed state of a cell membrane by identifying the cell membrane from the image of the living tissue based on dyed cell nucleuses within the captured image of the living tissue, and evaluating development of the HER2 protein based on the result of the discrimination.

An evaluation program product according to an exemplary aspect of the invention causes a computer to execute a capture procedure for capturing an image of a living tissue in which the HER2 protein and cell nucleuses are dyed, a discrimination procedure for identifying a cell membrane from the image of the living tissue based on dyed cell nucleuses within the captured image of the living tissue to discriminate a dyed state of the cell membrane, and an evaluation procedure for evaluating development of the HER2 protein based on the result of the discrimination.

The above and other objects, features, and advantages of the present invention will become apparent from the following description with reference to the accompanying drawings which illustrate an example of the present invention.

DESCRIPTION OF THE EXEMPLARY EMBODIMENTS

Figure 1:
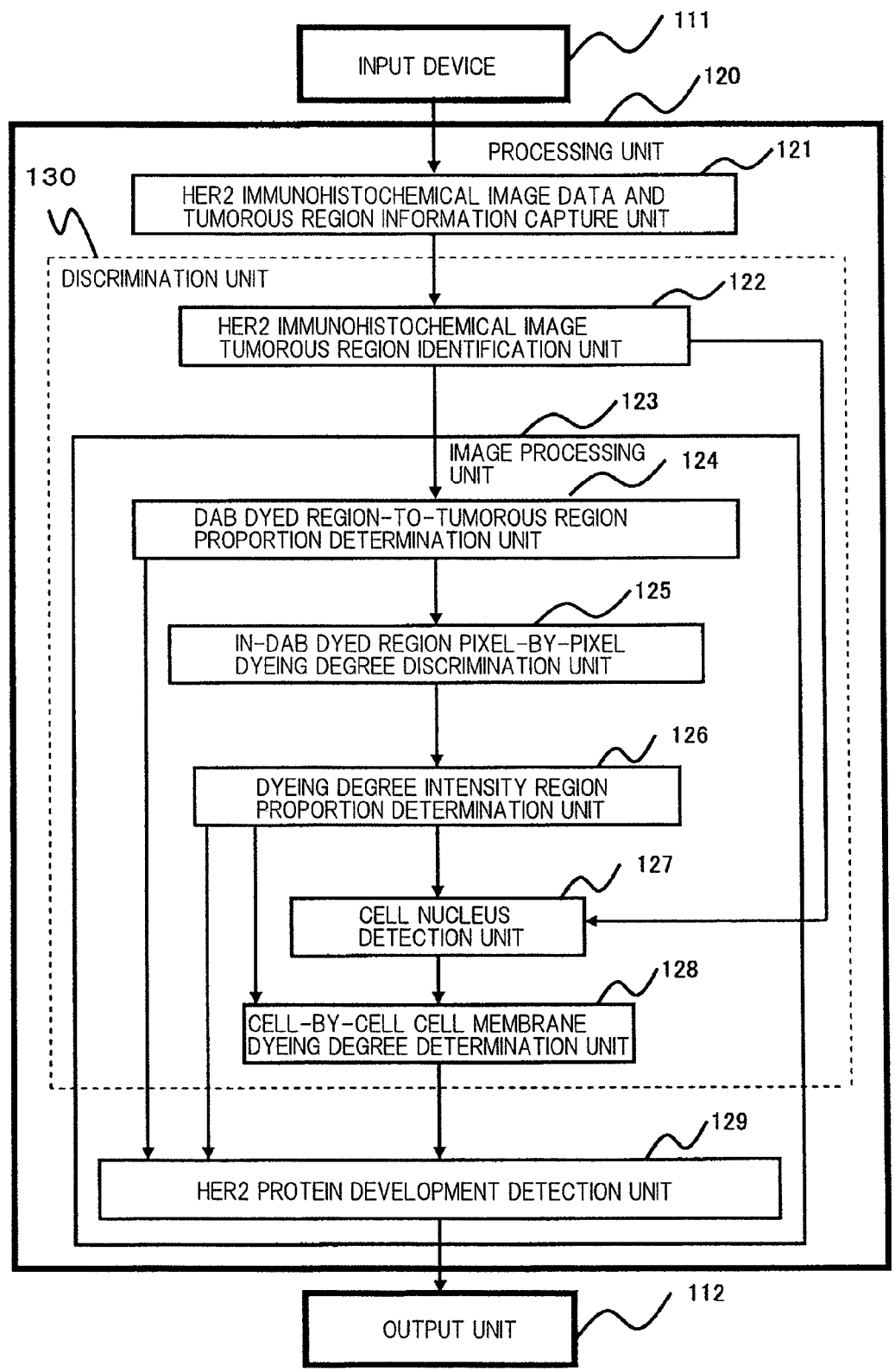
FIG. 1 is a block diagram showing an evaluation system according to a first exemplary embodiment of the present invention.

In the following, exemplary embodiments of the present invention will be described in detail with reference to the drawings. In the description of the drawings, the same components are designated the same reference numerals, and repeated descriptions are omitted.

First Exemplary Embodiment

FIG. 1 is a block diagram showing an evaluation system according to a first exemplary embodiment of the present invention.

The evaluation system quantitatively analyzes and evaluates the development of HER2 protein based on a pathological image Which has captured immunohistochemical staining cells for HER2 protein and cell nucleus.

The evaluation system comprises input device 111, output device 112, and processing unit 120.

As input device 111 and output device 112, normal input/output devices that are generally provided in a computer can be employed. Input device 111 is, for example, a keyboard or a mouse. Output device 112 is, for example, a display device or a printer.

Input device 111 may be, for example, an input file unit, or another computer. Also, output device 112 may be an output file unit, another computer or the like.

Processing unit 120 comprises HER2 immunohistochemical staining image data and tumorous region information capture unit (hereinafter simply called "capture unit") 121, HER2 immunohistochemical staining image tumorous region identification unit (hereinafter simply called "identification unit") 122, and image processing unit 123.

Image processing unit 123 can be generally referred to as image processing means.

Image processing unit 123 includes DAB dyed region-to-tumorous region proportion determination unit (hereinafter simply called "determination unit") 124, in-DAB dyed region pixel-by-pixel dyeing degree discrimination unit (hereinafter simply called "discrimination unit") 125, dyeing degree intensity region proportion determination unit (hereinafter simply called "determination unit") 126, cell nucleus detection unit (hereinafter simply called "detection unit") 127, cell-by-cell cell membrane dyeing degree determination unit (hereinafter called "determination unit") 128, and HER2 protein development determination unit (hereinafter simply called "determination unit") 129.

It should be noted that identification unit 122, determination unit 124, discrimination unit 125, determination unit 126, detection unit 127, and determination unit 128 are included in discrimination unit 130.

Capture unit 121 can be generally referred to as image capturing means and information-capturing means.

Capture unit 121 receives HER2 immunohistochemical staining image data, and information on a tumorous region in the HER2 immunohistochemical staining image data, from a user or the like through input device 111.

The HER2 immunohistochemical staining image data represents the image of a living tissue in which the HER2 protein and cell nucleus have been dyed. In this exemplary embodiment, HER2 immunohistochemical staining image data is an image of a living tissue in which HER2 protein and cell nucleus are dyed in colors different from each other. More specifically, HER2 immunohistochemical staining image data represents an image of a living tissue in which the HER2 protein is dyed in brown by DAB, while the cell nucleus is dyed in blue by hematoxylin.

Capture unit 121 provides identification unit 122 with the HER2 immunohistochemical staining image data and information on the tumorous region.

Identification unit 122 can be generally referred to as identifying means.

Identification unit 122 identifies a tumorous region from the HER2 immunohistochemical staining image data based on information on tumorous region. Identification unit 122 masks regions except for the tumorous region within the HER2 immunohistochemical staining image data.

Identification unit 122 provides determination unit 124 and detection unit 127 with HER2 immunohistochemical staining image data with masked regions except for the tumorous region, i.e., image data of the tumorous region.

Determination unit 124 can be generally referred to as dyed region proportion determining means.

Determination unit 124 extracts a DAB dyed region from the image data of the tumorous region received from identification unit 122. Determination unit 124 determines the proportion of the DAB dyed region within the tumorous region.

When the proportion of the DAB dyed region within the tumorous region is less than a predefined certain proportion (hereinafter called the "reference dyeing proportion (reference dyeing value)"), determination unit 124 provides determination unit 129 with information which indicates that the DAB dyed region is small.

On the other hand, the proportion of the DAB dyed region within the tumorous region is equal to or more than the reference dyed proportion, and determination unit 124 provides discrimination unit 125 with the image data of the tumorous region.

The DAB dyed region can be generally referred to as a HER2 protein dyed region.

Discrimination unit 125 can be generally referred to as dyed degree discriminating means.

Discrimination unit 125 discriminates the degree of dyeing of each pixel in the image data of the DAB dyed region within the image data of the tumorous region what is received from determination unit 124.

For example, discrimination unit 125 compares the degree of dyeing of each pixel which form part of the image data of the DAB dyed region using a predefined reference value.

Discrimination unit 125 discriminates a pixel whose degree of dyeing is less than the reference value as degree of dyeing "weak." On the other hand, discrimination unit 125 discriminates a pixel whose degree of dyeing is equal to or more than the reference value as degree of dyeing "strong" (hereinafter called the "strongly dyed pixel").

Discrimination unit 125 provides determination unit 126 with the image data of the tumorous region, and the discrimination result on the degree of dyeing for each pixel.

Determination unit 126 can be generally referred to as strongly dyed region proportion determining means.

Determination unit 126 determines the proportion of a region comprised of strongly dyed pixels which occupy the tumorous region based on the discrimination result of discrimination unit 125.

When the region, which is comprised of strongly dyed pixels, occupies the tumorous region at a proportion equal to or more than a predefined certain proportion (hereinafter called the "strong-dyeing reference value"), determination unit 126 provides determination unit 129 with information which indicates that the region comprised of strongly dyed pixels is large.

On the other hand, when the region comprised of strongly dyed pixels occupies the tumorous region at a proportion less than the strong-dyeing reference value, determination unit 126 provides detection unit 127 with information which indicates that the region comprised of strongly dyed pixels is not large, and provides determination unit 128 with the image data of the tumorous region and the discrimination result on the degree of dyeing for each pixel.

Detection unit 127 can be generally referred to as detecting means.

Detection unit 127, upon receipt of the information which indicates that the region comprised of strongly dyed pixels is not large, detects a dyed cell nucleus from the image data of the tumorous region of HER2 received from identification unit 122. In otherwords, detection unit 127 detects a cell nucleus from the tumorous region when the proportion of the DAB dyed region within the tumorous region is equal to or more than the reference dyeing proportion, and the proportion of the strongly dyed pixels in the tumorous region is less than the strong-dyeing reference value.

Detection unit 127 provides discrimination unit 128 with the result of detecting a cell nucleus.

Discrimination unit 128 can be generally referred to as cell membrane dyeing degree discriminating means.

Discrimination unit 128 identifies a cell membrane from the tumorous region based on the cell nucleus detected by detection unit 127. For example, discrimination unit 128 estimates and extracts a region surrounding the cell nucleus as the cell membrane.

Discrimination unit 128 examines whether or not there is a DAB dyed region (presence or absence of dyeing) in the cell membrane region, and the degree of dyeing discriminated by discrimination unit 125 for each pixel within the DAB dyed region to determine the dyed state of the cell membrane at three levels of "no chromaticity," "weak-middle dyeing intensity," and "middle-strong dyeing intensity.". In this regard, the dyed state of the cell membrane is not limited to the determination at three levels, but may be determined at a plurality of levels.

Discrimination unit 128 provides determination unit 129 with the result of determining the dyed state of the cell membrane.

Determination unit 129 can be generally referred to as evaluating means.

Determination unit 129 evaluates the development of HER2 protein based on the discrimination result of discrimination unit 128.

For example, determination unit 129 determines the development of the HER2 protein at four levels (0, 1+, 2+, 3+) based on the proportion of "no chromaticity," "weak-middle dyeing intensity," and "middle-strong dyeing intensity" in all cells within the tumorous region, and outputs the determination result from output device 112. In this regard, the development of HER2 protein is not limited to the determination at four levels, but may be determined at a plurality of levels.

Discrimination unit 130 can be generally referred to as discriminating means.

Discrimination unit 130 identifies a cell membrane from the image of the living tissue captured by capture unit 121 based on dyed cell nucleuses within the image of the living tissue to discriminate the dyed state of the cell membrane.

Next, operations will be described.

Figure 2:
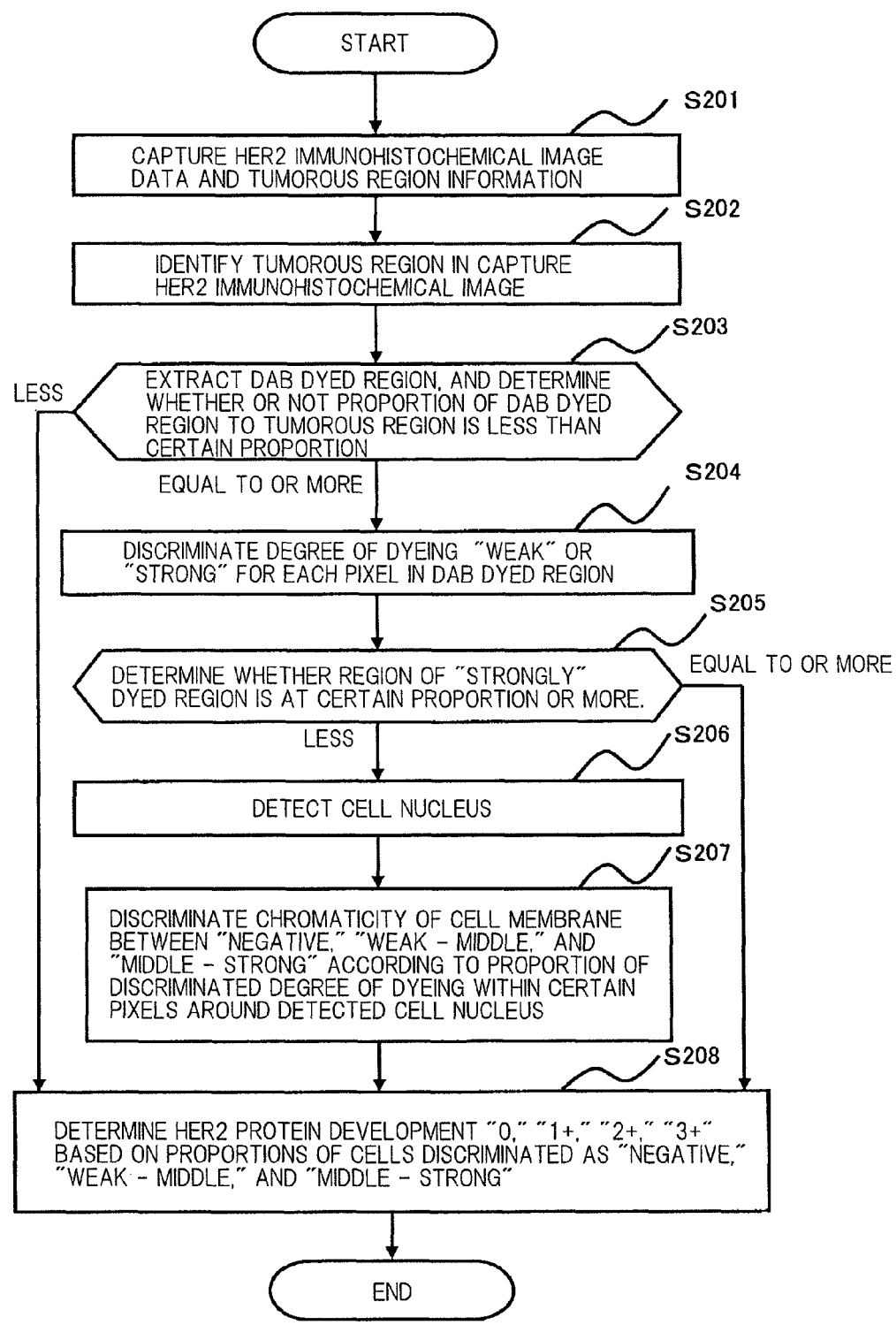
FIG. 2 is a flow chart for describing exemplary operations of the system shown in FIG. 1.

FIG. 2 is a flow chart for describing exemplary operations of the first exemplary embodiment.

In summary, the operations shown in FIG. 2 are performed by a method of quantitatively analyzing and evaluating the development of HER2 protein using a pathological image which has captured a group of immunohistochemical staining cells, and includes the following steps (A)-(H).

It should be noted that processing unit 120 shown in FIG. 1 may be implemented by a computer which operates in accordance with a program recorded in a CD-ROM, a hard disk drive, or a memory. The CD-ROM, hard disk drive, or memory can be generally referred to as a computer readable recording medium.

In this event, the computer functions as capture unit 121, discrimination unit 130, and discrimination unit 129 by reading and executing the program from the recording medium.

For example, this program is read from a recording medium and executed by a computer to cause the computer to execute the following steps (A)-(H):

(A) a capturing step of capturing HER2 immunohistochemical staining image data and tumorous region information;

(B) an identifying step of identifying a tumorous region in a HER2 immunohistochemical staining image;

(C) a DAB dyed region proportion determining step of extracting a DAB dyed region to determine whether or not the DAB dyed region is equal to or less than a certain proportion;

(D) an in-DAB dyed region pixel-by-pixel degree of dyeing discriminating step of discriminating whether a degree of dyeing of the DAB dyed region is "weak" or "strong";

(E) a strong dyed region proportion determining step of determining whether or not a region determined as presenting the "strong" degree of dyeing is at a certain proportion or more.

(F) a cell nucleus detecting step of detecting a cell nucleus.

(G) a cell-by-cell cell membrane degree of dyeing discriminating step of estimating and extracting a cell membrane from a region surrounding the detected cell nucleus, examining whether or not the cell membrane is DAB dyed and a degree of dyeing, and discriminating the chromaticity of the cell membrane at three levels of "negative," "weak-middle," and "middle-strong"; and (H) a HER2 protein development determining step of determining the development of HER2 protein at four levels of "0," "1+," "2+," and "3+" according to the proportions of cells determined as "negative," "weak-middle," and "middle-strong."

More specifically, at step S201, capture unit 121 first reads HER2 immunohistochemical staining image data and information on a tumorous region from input device 111. Capture unit 121 provides identification unit 122 with the HER2 immunohistochemical staining image data and information on the tumorous region.

Upon receipt of the HER2 immunohistochemical staining image data and information on the tumorous region, identification unit 122 executes step S202.

At step S202, identification unit 122 first identifies a tumorous region on the HER2 immunohistochemical staining image data using the information on the tumorous region.

Then, identification unit 122 masks regions except for the tumorous region within the HER2 immunohistochemical staining image data.

Next, identification unit 122 provides determination unit 124 and detection unit 127 with the HER2 immunohistochemical staining image data having masked regions except for the tumorous region (image data of the tumorous region).

At this stage, step S202 ends.

Determination unit 124 executes step S203 upon receipt of the image data of the tumorous region.

At step S203, determination unit 124 first determines a DAB dyed region and a non-DAB dyed region within the tumorous region by a discriminant analysis or the like.

Then, determination unit 124 extracts the DAB dyed region, and determines the proportion of the DAB dyed region within the tumorous region.

Next, when the proportion of the DAB dyed region is less than a certain proportion (reference dyeing value), determination unit 124 provides determination unit 129 with information which indicates that the DAB dyed region is small.

On the other hand, when the DAB dyed region is equal to or more than the certain proportion (reference dyeing value), determination unit 124 provides discrimination unit 125 with the image data of the tumorous region.

At this stage, step S203 ends.

Upon receipt of the image data of the tumorous region, discrimination unit 125 executes step S204.

At step S204, discrimination unit 125 first determines whether the degree of dyeing is "weak" or "strong" (strongly dyed pixel) for each pixel in the DAB dyed region within the image data of the tumorous region received from determination unit 124.

Then, discrimination unit 125 provides determination unit 126 with the image data of the tumorous region and the discrimination result on the degree of dyeing for each pixel.

At this stage, step S204 ends.

Determination unit 126 executes step S205 upon receipt of the image data of the tumorous region and the discrimination result on the degree of dyeing for each pixel.

At step S205, determination unit 126 first determines the proportion at which a region comprised of strongly dyed pixels occupies the tumorous region, based on the discrimination result by discrimination unit 125.

When the proportion at which the region comprised of strongly dyed pixels that occupy the tumorous region is equal to or more than a certain proportion (strong-dyeing reference value), discrimination unit 126 provides determination unit 129 with information which indicates that the region comprised of the strongly dyed pixels is large.

On the other hand, when the proportion at which the region that is comprised of strongly dyed pixels and that occupies the tumorous region is less than the certain proportion (strong-dyeing reference value), determination unit 126 provides detection unit 127 with information which indicates that the region comprised of the strongly dyed pixels is not large, and provides determination unit 128 with the image data of the tumorous region and the discrimination result on the degree of dyeing for each pixel.

At this stage, step S205 ends.

Detection unit 127 executes S206 upon receipt of the information which indicates that the region comprised of the strongly dyed pixels is not large.

At step S206, detection unit 127 detects a cell nucleus from the image data of the tumorous region of HER2 received from identification unit 122.

Detection unit 127 performs cell nucleus extraction processing, for example, in the following manner.

First, detection unit 127 converts the image data of the tumorous region to image data in an HSV color space. In this regard, in the HSV color space, color is represented by three elements: hue (H), saturation (S), and brightness (V).

Next, detection unit 127 calculates a value with an emphasized brightness (V) value for the image data of the tumorous region using a sigmoid function in consideration of the average and variance of the brightness (V) value.

Then, detection unit 127 compares the calculated value with a certain threshold, and converts the image data of the tumorous region to a binary image by determining a value equal to or less than the threshold as being within a nucleus region (=1) and a value more than the threshold value as being out of the nucleus region (=0).

Next, detection unit 127 applies a Gauss filter to the binary image, and compares adjacent pixels with each other to calculate the position of the cell nucleus.

Detection unit 127 provides discrimination unit 128 with the cell nucleus detection result.

At this stage, step S206 ends.

Upon receipt of the cell nucleus detection result, discrimination unit 128 executes step S207.

At step S207, discrimination 128 first identifies a cell membrane from the tumorous region based on the cell nucleus detected in detection unit 127. For example, discrimination unit 128 estimates and extracts a region surrounding the cell nucleus as a cell membrane.

Discrimination unit 128 examines whether or not there is a DAB dyed region (presence or absence of dyeing) in the cell membrane region, and examines the degree of dyeing discriminated in discrimination unit 125 for each pixel within the DAB dyed region to determine a dyed state of the cell membrane at three levels of "no chromaticity," "weak-middle dyeing intensity," and "middle-strong dyeing intensity."

Figure 3:
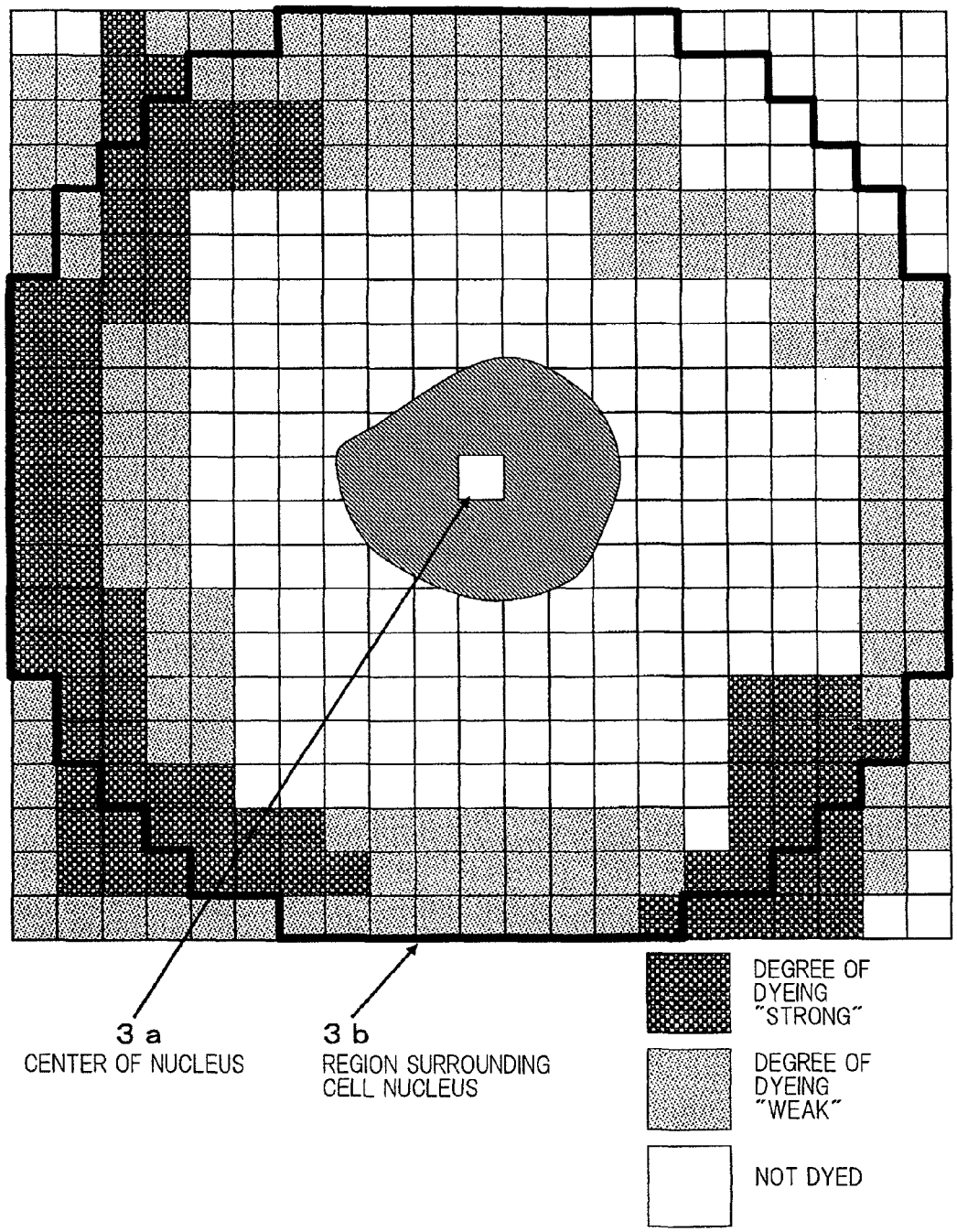
FIG. 3 is an explanatory diagram showing extraction of a cell membrane and the degree of dyeing of the cell membrane.
Figure 4:
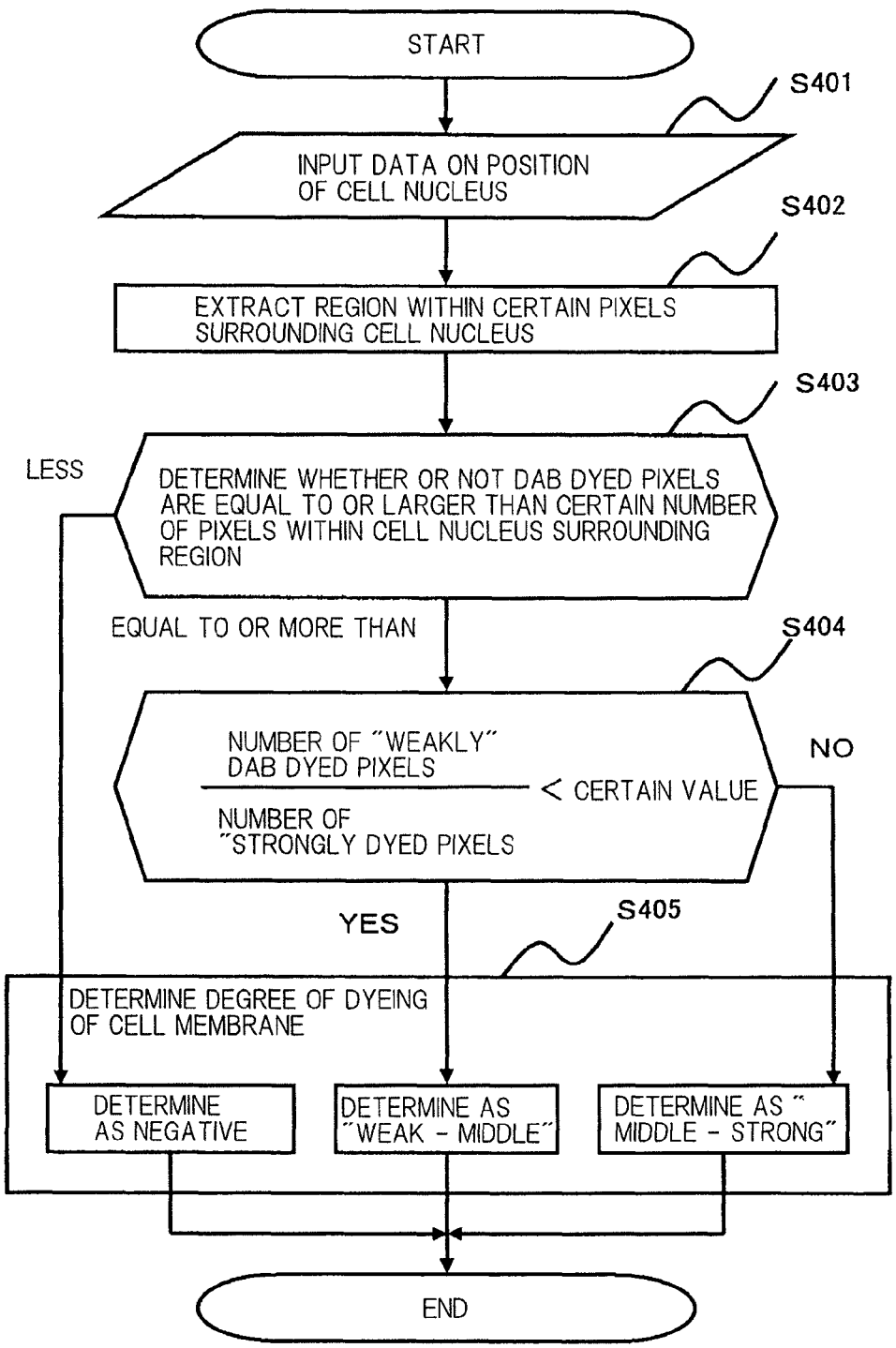
FIG. 4 is a flow chart for describing exemplary operations in determining of the degree of dyeing of cell membrane.

FIGS. 3 and 4 are explanatory diagrams for describing dyeing intensity determination processing.

When discrimination unit 128 receives center position 3a of the cell nucleus, which is detected at step S206, at step S401, discrimination unit 128 extracts a region that formed certain pixels that distance from center position 3a of the cell nucleus is equal or lower a certain distance as cell nucleus surrounding region 3b at step S402.

Next, at step S403, discrimination unit 128 determines whether or not the number of DAB dyed pixels is equal to or more than a certain number of pixels within cell nucleus surrounding region 3b.

When the number of DAB dyed pixels is less than a specific number of pixels, discrimination unit 128 determines that the cell membrane dyeing is "negative" at step S405.

On the other hand, when the number of DAB dyed pixels is equal to or more than a specific number of pixels, discrimination unit 128 calculates the ratio of the pixels whose DAB degree of dyeing is "weak" to the pixels whose DAB degree of dyeing is "strong" at step S404.

When the calculated ratio is less than a preset certain value, discrimination unit 128 determines that the cell membrane dyeing is "weak-middle" at step S405.

On the other hand, when the calculated ratio is equal to or more than the specific value, discrimination unit 128 determines that the cell membrane dyeing is "middle-strong" at step S405.

Discrimination unit 128 provides determination unit 129 with the determination result on a cell-by-cell basis.

At this stage, step 207 ends.

Upon receipt of the determination result on a cell-by-cell basis, determination unit 129 executes step S208.

At step S208, determination unit 129 determines the development of HER2 protein at four levels (0, 1+, 2+, 3+) based on the proposition of "no chromaticity," "weak-middle dyeing intensity" and "weak-middle dyeing intensity" in all cell in the tumor region.

Figure 5:
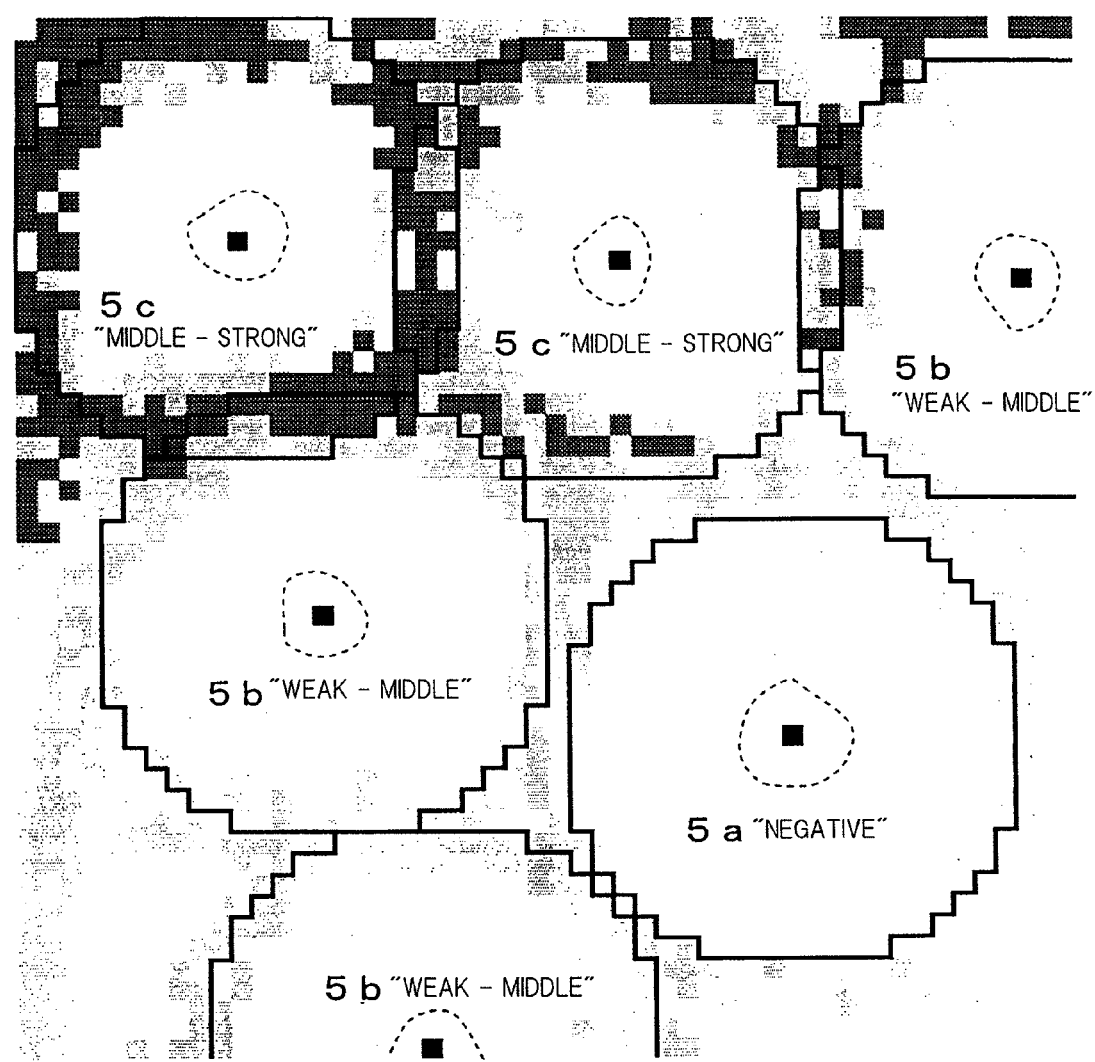
FIG. 5 is an explanatory diagram showing the degree of dyeing of cell membranes in units of cells.

FIG. 5 is an explanatory diagram for describing an exemplary determination on the development of HER2 protein.

Assuming that among all detected cells, the proportion of cells 5a, determined at step 207 as "negative" for the degree of dyeing of cell membrane, is represented by "% negative"; the proportion of cells 5b, determined as "weak-middle" by "% weak"; and the proportion of cells 5c, determined as "middle-strong" by "% strong," determination unit 129 calculates, for example, the value of function f (f=1×"% negative"+2×"% weak"+3×"% strong").

Then, determination unit 129 compares the value of f with three certain thresholds a, b, and c (where a<b<c).

Determination unit 129 determines "0" when value of f<a; "1+" when a≦value of f<b; "+2" when b≦value of f<c; and "3+" when c≦value of f.

Also, determination unit 129 determines "0" when it receives information which indicates that the DAB dyed region is small, while determination unit 129 determines "3+" when it receives from determination unit 126 information which indicates that the region comprised of strongly dyed pixels is large, Next, a description will be given of effects of this exemplary embodiment.

In this exemplary embodiment, discrimination unit 130 identifies a cell membrane from an image of a living tissue based on a dyed cell nucleus within the image of the living tissue, and discriminates a dyed state for that cell membrane. Determination unit 129 evaluates the development of HER2 protein based on the discrimination result by discrimination unit 130.

It is therefore possible to quantitatively evaluate the development of HER2 protein which localizes in the cell membrane of a cancer cell. Accordingly, a pathologist can diagnose the development of HER2 using an evaluation value for the development of HER2 protein.

In this regard, the effect of enabling quantitative evaluation of the development of HER2 protein which localizes in a cell membrane of a cancer cell can be also produced by processing unit 120 which comprises discrimination unit 130 which includes discrimination unit 125, detection unit 127, and discrimination unit 128, capture unit 121, and determination unit 129.

Also, in this exemplary embodiment, discrimination unit 130 includes discrimination unit 125, detection unit 127, and discrimination unit 128.

Discrimination unit 125 discriminates pixel degree of dyeing (degree of dyeing of HER2 protein) for each pixel which represents dyed HER2 protein within the image of a living tissue. Detection unit 127 detects a dyed cell nucleus from the image of the living tissue. Discrimination unit 128 identifies a cell membrane from the image of the living tissue based on the cell nucleus detected in detection unit 127, and determines a dyed state of the cell membrane based on a degree of dyeing of pixels corresponding to the cell membrane, among those pixels for which the degree of dyeing has been discriminated by discrimination unit 125.

In this event, the degree of dyeing can be discriminated with high accuracy because the degree of dyeing is discriminated in units of pixels. Associated therewith, it is possible to discriminate a dyed state of a cell membrane with high accuracy.

Also, in this exemplary embodiment, capture unit 121 captures information about a tumorous region in an image of a living tissue. Discrimination unit 130 includes identification unit 122 for identifying a tumorous region from the image of the living tissue based on the information about the tumorous region captured in capture unit 121.

Discrimination unit 125 discriminates the pixel degree of dyeing (degree of dyeing of HER2 protein) for each pixel representative of dyed HER2 protein within the tumorous region identified by identification unit 122. Detection unit 127 detects a dyed cell nucleus from the tumorous region identified by identification unit 122.

In this event, a pathologist can diagnose the development of HER2 using an evaluation value on the development of HER2 protein for the tumorous region under testing.

Also, in this exemplary embodiment, discrimination unit 130 includes determination unit 124 and determination unit 126.

Determination unit 124 extracts a dyed region of HER2 protein from a tumorous region, and determines the proportion of the dyed region of HER2 protein within the tumorous region. Determination unit 126 determines the proportion of the tumorous region that is occupied by strongly dyed pixels, whose degree of dyeing is equal to or more than a predefined reference value, based on pixels for which the degree of dyeing has been discriminated in discrimination unit 125.

Detection unit 127 detects a cell nucleus from the tumorous region when the proportion of the dyed region of HER2 protein in the tumorous region is equal to or more than a predefined reference dyeing value and when the proportion of strongly dyed pixels in the tumorous region is less than a predefined strong-dyeing reference value.

In this event, detection unit 127 can be operated only when a determination result by determination unit 128 is required. It is therefore possible to prevent unnecessary operations of detection unit 127 and determination unit 128.

In contrast to this exemplary embodiment, the results of visual determination of the development by a pathologist cannot be reproduced, lack objectivity and are semi-quantitative. Also, the visual determination can evaluate the development of ER (estrogen receptor) or PrG (progesterone receptor) in which cell nucleuses are dyed, but cannot evaluate the development of HER2 in which cell membranes are dyed.

Also, according to this exemplary embodiment, discrimination unit 130 can detect a cell nucleus, estimate and extract a cell membrane from a region surrounding the cell nucleus, and calculate the chromaticity and dyeing intensity of the cell membrane. On the other hand, the technology described in Non-Patent Document 1 can find the ratio of an area dyed in brown to an area dyed in blue, but cannot identify cell membrane.

Alternatively, determination unit 129 may output display data indicative of an image which displays a dyed state of cell membrane discriminated on a cell-by-cell basis over HER2 immunohistochemical image data to output device 112, and output device 112 may display an image in accordance with the display data (image which displays a dyed state of cell membrane discriminated on a cell-by-cell basis over the HER2 immunohistochemical image data).

In this event, the displayed image is useful information with respect to diagnosis by doctors and can support the diagnosis.

Further, from the fact that the number of tissue diagnoses and cell diagnoses is increasing, but that the number of pathologists is insufficient therefore, there is the problem in which pathologists are required to carry heavy workloads, but according to this embodiment, it is possible to alleviate this heavy workload and burden placed on pathologists.

Second Exemplary Embodiment

Figure 6:
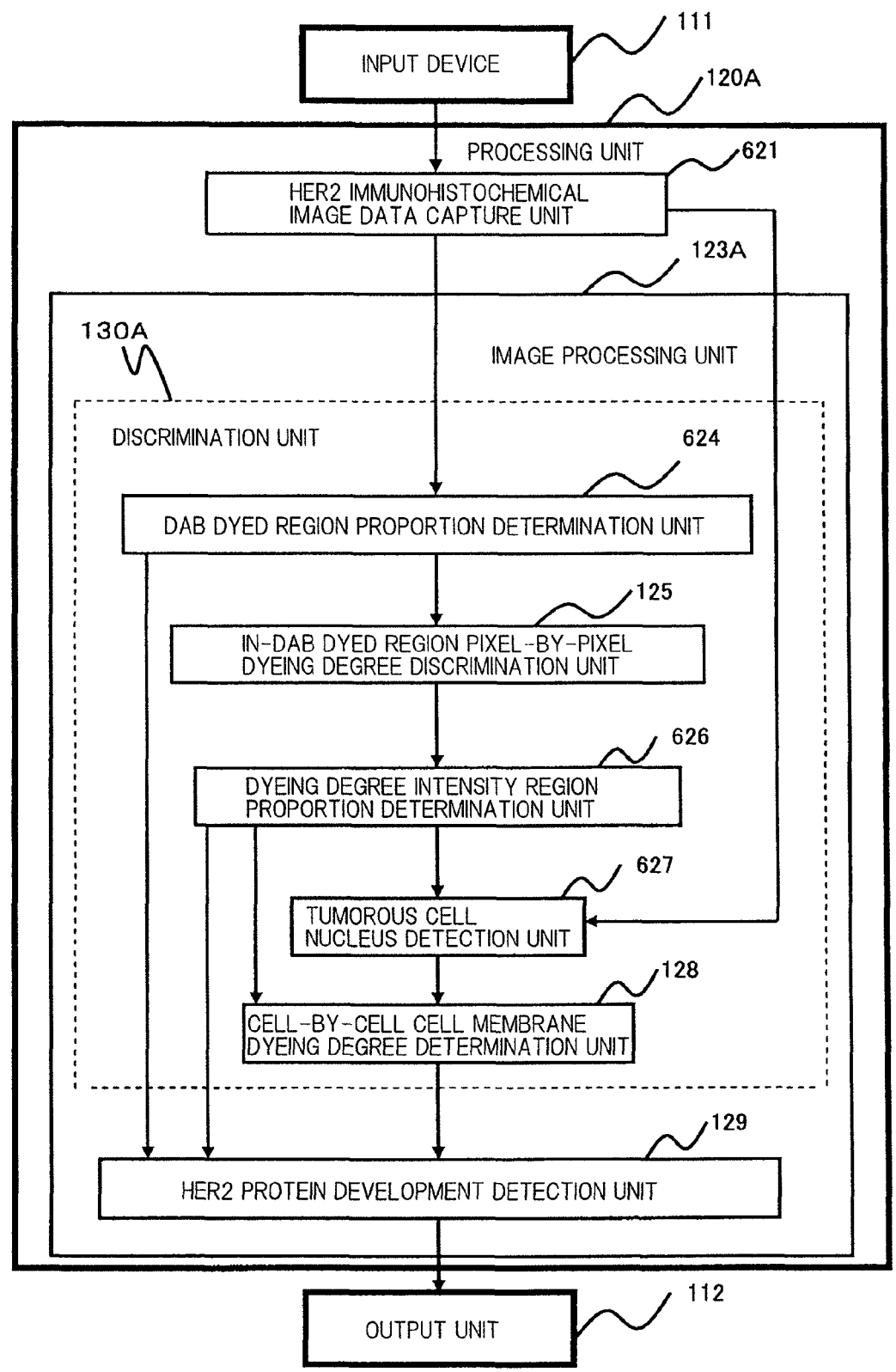
FIG. 6 is a block diagram showing a second embodiment of an evaluation system according to the present invention.

FIG. 6 is a block diagram showing a second exemplary embodiment of an evaluation system according to the present invention.

In the system of this embodiment, HER2 immunohistochemical staining image data capture unit (hereinafter simply referred to as "capture unit") 621 is provided instead of capture unit 121, identification unit 122 is omitted, DAB dyed region proportion determination unit (hereinafter simply referred to as "determination unit") 624 is provided instead of determination unit 124, dyeing degree intensity region proportion determination unit (hereinafter simply referred to as "determination unit") 626 is provided instead of determination unit 126, and tumorous cell nucleus detection unit (hereinafter simply referred to as "detection unit") 627 is provided instead of detection unit 127. The system of this exemplary embodiment differs from the first exemplary embodiment in these aspects.

In FIG. 6, capture unit 621 can be generally referred to as image capturing means.

Capture unit 621 receives HER2 immunohistochemical staining image data including a tumorous region from a user or the like through an input device 111. Capture unit 621 provides determination unit 624 with the HER2 immunohistochemical staining image data including a tumorous region.

Determination unit 624 can be generally referred to as dyed region proportion determining means.

Determination unit 624 extracts a DAB dyed region from the HER2 immunohistochemical staining image data received from capture unit 621. Determination unit 624 determines the proportion of the DAB dyed region within an image data region.

When the proportion of the DAB dyed region in the image data region is less than a predefined certain proportion (hereinafter called the "second reference dyeing proportion"), determination unit 624 provides determination unit 129 with information which indicates that the DAB dyed region is small.

On the other hand, when the proportion of the DAB dyed region in the image data region is equal to or more than the second reference dyeing value, determination unit 624 provides discrimination unit 125 with the HER2 immunohistochemical staining image data.

Determination unit 626 can be generally referred to as strong dyeing proportion determining means.

Determination unit 626 determines the proportion at which a region comprised of strongly dyed pixels occupies the HER2 immunohistochemical staining image, based on the discrimination result by discrimination unit 125.

When the proportion at which the region that is comprised of strongly dyed pixels occupies the HER2 immunohistochemical staining image is equal to or more than a predefined certain proportion (hereinafter called the "second strong-dyeing reference value"), discrimination unit 626 provides determination unit 129 with information which indicates that the region comprised of the strongly dyed pixels is large.

On the other hand, when the proportion at which the region that is comprised of strongly dyed pixels occupies the HER2 immunohistochemical staining image is less than the second strong-dyeing reference value, determination unit 626 provides detection unit 627 with information which indicates that the region comprised of the strongly dyed pixels is not large, and provides determination unit 128 with HER2 immunohistochemical staining image data and the discrimination result on the degree of dyeing for each pixel.

Detection unit 627 can be generally referred to as detecting means.

Detection unit 627 detects a cell nucleus of a tumorous cell (hereinafter called the "tumorous cell nucleus" as well) from the HER2 immunohistochemical staining image data received from capture unit 621. The tumorous cell nucleus is known to be larger than a normal cell nucleus. Accordingly, detection unit 627 calculates, for example, an average size of cell nucleuses, and detects and excludes cell nucleuses smaller than the average size of cell nucleuses.

Detection unit 627 provides discrimination unit 128 with the result of detecting the tumorous cell nucleus.

It should be noted that processing unit 120A shown in FIG. 6 may be implemented by a computer which operates in accordance with a program recorded in a CD-ROM, a hard disk drive, or a memory.

In this event, the computer functions as capture unit 621, discrimination unit 130A, and discrimination unit 129 by reading and executing the program from the recording medium.

Next, operations of the second exemplary embodiment will be described.

Figure 7:
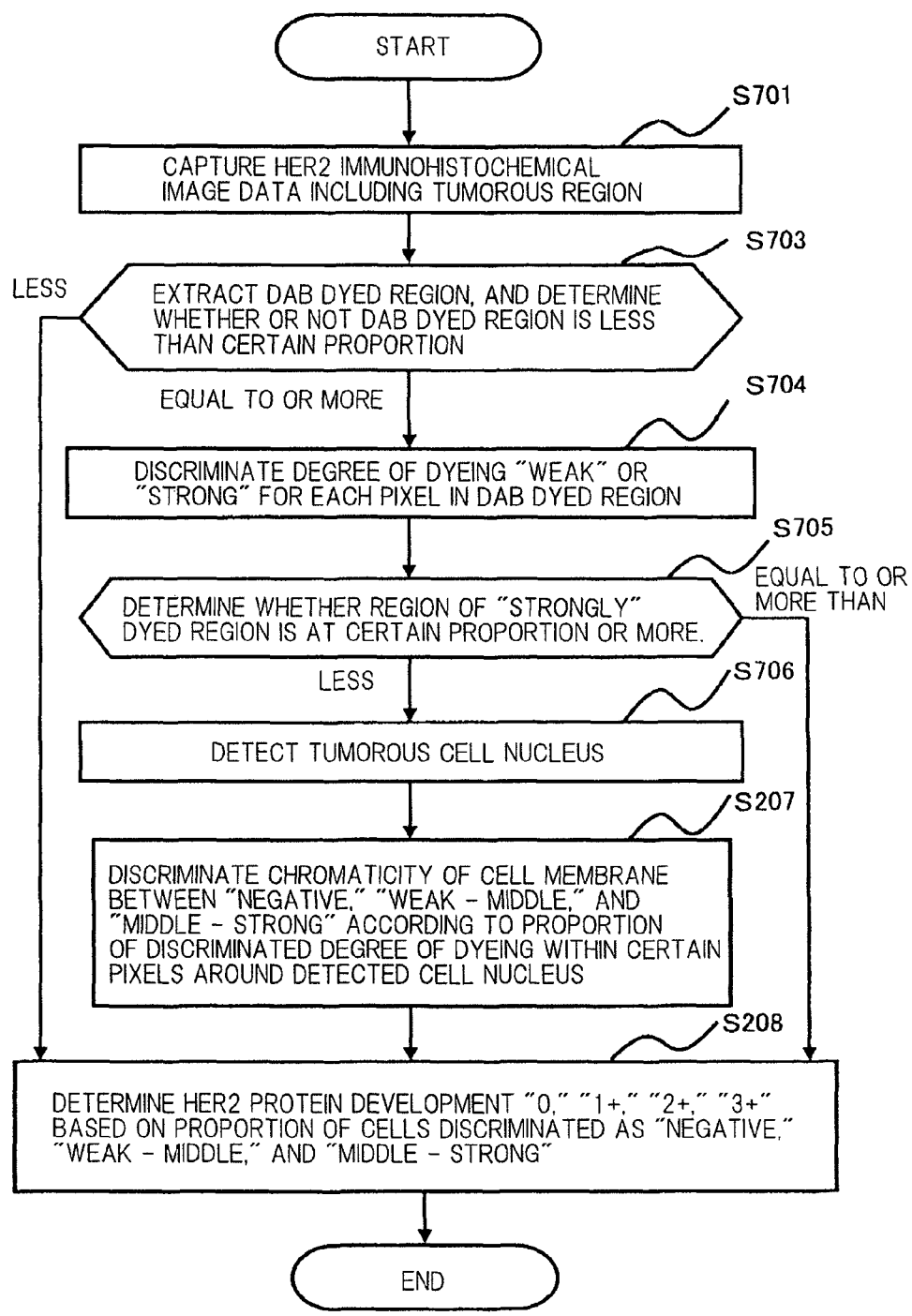
FIG. 7 is a flow chart for describing exemplary operations of the system shown in FIG. 6.

FIG. 7 is a flow chart for describing exemplary operations of the second exemplary embodiment. In FIG. 7, the same processing as that shown in FIG. 2 is designated the same reference numeral. The following description will be given of those operations which differ from the processing shown in FIG. 2.

The processing of this exemplary embodiment differs from the processing of the first exemplary embodiment shown in FIG. 2 in reading HER2 immunohistochemical staining image data including a tumorous region, determining the proportion of a DAB dyed region in an image data region, determining the proportion of a region with "strong" degree of dyeing in the image data region, and detecting a tumorous cell nucleus, and the remaining operations are similar to those of the first exemplary embodiment.

First at step S701, capture unit 621 reads HER2 immunohistochemical staining image data including a tumorous region from input device 111. Capture unit 621 provides determination unit 624 with the HER2 immunohistochemical staining image data including the tumorous region.

Upon receipt of the HER2 immunohistochemical staining image data including the tumorous region, determination unit 624 executes step S703.

At step S703, determination unit 624 first determines a DAB dyed region and a non-DAB dyed region within the HER2 immunohistochemical staining image by a discriminant analysis or the like.

Then, determination unit 624 extracts the DAB dyed region, and determines the proportion of the DAB dyed region within the image data region.

Next, when the proportion of the DAB dyed region within the image data region is less than a certain proportion (second reference dyeing proportion, i.e., second reference dyeing value), determination unit 624 provides determination unit 129 with information which indicates that the DAB dyed region is small.

On the other hand, when the proportion of the DAB dyed region within the image data region is equal to or more than the certain proportion (second reference dyeing proportion), determination unit 624 provides discrimination unit 125 with the HER2 immunohistochemical staining image data.

At this stage, step S703 ends.

Upon receipt of the HER2 immunohistochemical staining image data, discrimination unit 125 executes step S704.

At step S704, discrimination unit 125 first determines whether the degree of dyeing is "weak" or "strong" (strongly dyed pixel) for each pixel in the DAB dyed region within the HER2 immunohistochemical staining image data.

Then, discrimination unit 125 provides determination unit 126 with the HER2 immunohistochemical staining image data and the discrimination result on the degree of dyeing for each pixel.

At this stage, step S704 ends.

Determination unit 626 in turn executes step S705 upon receipt of the HER2 immunohistochemical staining image data and the discrimination result on the degree of dyeing for each pixel.

At step S705, determination unit 626 first determines the proportion at which a region that is comprised of strongly dyed pixels occupies the HER2 immunohistochemical staining image data, based on the discrimination result by discrimination unit 125.

When the proportion at which the region that is comprised of strongly dyed pixels occupies the HER2 immunohistochemical staining image data is equal to or more than a predefined certain proportion (second strong-dyeing reference value), discrimination unit 126 provides determination unit 129 with information which indicates that the region comprised of the strongly dyed pixels is large.

On the other hand, when the proportion at which the region that is comprised of strongly dyed pixels occupies the HER2 immunohistochemical staining image data is less than the second strong-dyeing reference value, determination unit 126 provides detection unit 627 with information which indicates that the region comprised of the strongly dyed pixels is not large, and provides determination unit 128 with HER2 immunohistochemical staining image data and the discrimination result on the degree of dyeing for each pixel.

At this stage, step S705 ends.

Detection unit 627 executes S706 upon receipt of the information which indicates that the region comprised of the strongly dyed pixels is not large.

At step S706, detection unit 627 detects a tumorous cell nucleus from the HER2 immunohistochemical staining image data. For example, detection unit 627 calculates the average size of cell nucleuses, and detects and excludes cell nucleuses smaller than the average size of cell nucleuses.

At this stage, step S706 ends.

Next, a description will be given of effects of this exemplary embodiment.

In this exemplary embodiment, detection unit 627 detects a cell nucleus of a tumorous cell from the image of a living tissue. Discrimination unit 128 identifies a cell membrane of the tumorous cell from the image of the living tissue based on the cell nucleus of the tumorous cell detected in detection unit 627. Discrimination unit 128 discriminates a dyed state of the cell membrane of the tumorous cell based on the degree of dyeing in pixels corresponding to the cell membrane of the tumorous cell, among those pixels in which the degree of dyeing has been discriminated by discrimination unit 125.

Accordingly, a pathologist can diagnose the development of HER2 using an evaluation value for the development of HER2 protein for cell membranes of tumorous cells under testing.

Also, while the first exemplary embodiment captures tumorous region information to identify a tumorous region in an HER2 immunohistochemical staining image, this exemplary embodiment can quantitatively analyze and evaluate the development of HER2 protein even if tumorous region is not specified, with the aid of detection unit 627 which determines the size of cell nucleuses and excludes cells that are different from tumorous region from those under testing.

In this exemplary embodiment, discrimination unit 130A includes determination unit 624 and determination unit 626.

Determination unit 624 extract a HER2 protein dyed region from the image of a living tissue, and determines the proportion of the HER2 protein dyed region within the image of the living tissue. Determination unit 626 determines the proportion of the image of the living tissue that is occupied by strongly dyed pixels, whose degree of dyeing is equal to or more than a predefined reference value, based on pixels for which the degree of dyeing has been discriminated in discrimination unit 125.

Detection unit 627 detects a cell nucleus of tumorous cell from the image of the living tissue when the proportion of the dyed region of HER2 protein in the image of the living tissue is equal to or more than a predefined reference dyeing value and when the proportion of strongly dyed pixels in the image of the living tissue is less than a predefined strong-dyeing reference value.

In this event, detection unit 627 can be operated only when the determination result by determination unit 128 is required. It is therefore possible to prevent unnecessary operations of detection unit 627 and determination unit 128.

The remaining effects of this exemplary embodiment are similar to those of the first exemplary embodiment.

In addition, the method of capturing tumorous region information, and identifying a tumorous region in a HER2 immunohistochemical staining image, according to the first exemplary embodiment, may be used in combination with a method of detecting tumorous cell nucleuses according to the second exemplary embodiment.

Alternatively, like the first exemplary embodiment, determination unit 129 may output display data indicative of an image which displays a dyed state of cell membrane discriminated on a cell-by-cell basis over HER2 immunohistochemical staining image data to output device 112, and output device 112 may display an image in accordance with the display data (an image which displays the dyed state of a cell membrane discriminated on a cell-by-cell basis over the HER2 immunohistochemical staining image data).

In this event, the displayed image is useful information with respect to diagnosis by doctors and can support the diagnosis.

It should be understood that the present invention is not limited to each exemplary embodiment described above, and can be modified in various ways.

For example, each exemplary embodiment described above is not limited to a breast cancer diagnosis, but can be extended to other immunohistochemistry, and to visual evaluation of an existing amount of a particular substance.

An exemplary effect of the present invention is the ability to quantitatively evaluate the development of HER2 protein.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. An evaluation system comprising:
a capture unit that captures an image of a living tissue in which HER2 protein and cell nucleuses are dyed;
a discrimination unit that identifies a cell membrane from the image of the living tissue based on dyed cell nucleuses within the image of the living tissue captured by said capture unit to discriminate a dyed state of the cell membrane; and
an evaluation unit that evaluates development of the HER2 protein based on a discrimination result by said discrimination unit.

2. The evaluation system according to claim 1, wherein said discrimination unit includes:
a dyeing degree discrimination unit that discriminates degree of dyeing of the HER2 protein for each pixel that represents dyed HER2 protein within the image of the living tissue;
a detection unit that detects the dyed cell nucleus from the image of the living tissue; and
a cell membrane dyeing degree discrimination unit that identifies the cell membrane from the image of the living tissue based on the cell nucleus detected in said detection unit, and discriminates the dyed state of the cell membrane based on the degree of dyeing in a pixel corresponding to the cell membrane in each pixel whose degree of dyeing is discriminated in said dyeing degree discrimination unit.

3. The evaluation system according to claim 2, wherein:
said capture unit further captures information about a tumorous region in the image of the living tissue;
said discrimination unit further includes an identification unit that identifies the tumorous region from the image of the living tissue based on the information on the tumorous region captured by said capture unit;
said dyeing degree discrimination unit discriminates the degree of dyeing of the HER2 protein for each pixel that represents the dyed HER2 protein within the tumorous region identified by said identification unit; and
said detection unit detects the dyed cell nucleus from the tumorous region identified by said identification unit.

4. The evaluation system according to claim 2, wherein:
said detection unit detects a cell nucleus of a tumorous cell from the image of the living tissue; and
said cell membrane dyeing degree discrimination unit identifies the cell membrane of the tumorous cell from the image of the living tissue based on the cell nucleus of the tumorous cell detected by said detection unit, and discriminates the dyed state of the cell membrane of the tumorous cell based on the degree of dyeing in a pixel corresponding to the cell membrane of the tumorous cell in each pixel whose degree of dyeing is discriminated by said dyeing degree discrimination unit.

5. The evaluation system according to claim 3, wherein said discrimination unit further includes:
a dyed region proportion determination unit that extracts a dyed region that has the HER2 protein from the tumorous region, and determines a proportion of the dyed region that has the HER2 protein within the tumorous region; and
a strong-dyeing proportion determination unit that determines a proportion at which the tumorous region is occupied by strongly dyed pixels whose degree of dyeing is equal to or more than a predefined reference value based on the pixels whose degree of dyeing is discriminated by said dyeing degree discrimination unit,
wherein said detection unit detects the cell nucleus of the tumorous cell from the tumorous region when the proportion of the dyed region that has the HER2 protein is equal to or more than a predefined reference dyeing value within the tumorous region, and when the proportion of the strongly dyed pixels is less than a predefined reference strong-dyeing value within the tumorous region.

6. The evaluation system according to claim 4, wherein said discrimination unit further includes:
a dyed region proportion determination unit that extracts a dyed region that has the HER2 protein from the image of the living tissue, and determines a proportion of the dyed region that has the HER2 protein within the image of the living tissue; and
a strong dyeing proportion determination unit that determines a proportion at which the image of the living tissue is occupied by strongly dyed pixels whose degree of dyeing is equal to or more than a predefined reference value, based on the pixels whose degree of dyeing is discriminated by said dyeing degree discrimination unit,
wherein said detection unit detects the cell nucleus of the tumorous cell from the image of the living tissue when the proportion of the dyed region that has the HER2 protein is equal to or more than a predefined reference dyeing value within the image of the living tissue, and when the proportion of the strongly dyed pixels is less than a predefined reference strong-dyeing value within the image of the living tissue.

7. The evaluation system according to claim 1, wherein said evaluation unit further outputs display data representative of an image which displays the dyed state of the cell membrane discriminated by said discrimination unit on the image of the living tissue.

8. An evaluation system comprising:
capturing means for capturing an image of a living tissue in which HER2 protein and cell nucleuses are dyed;

discriminating means for identifying a cell membrane from the image of the living tissue based on dyed cell nucleuses within the image of the living tissue captured by said capturing means, and discriminating a dyed state of the cell membrane; and evaluating means for evaluating development of the HER2 protein based on a discrimination result by said discriminating means.

9. An evaluation method comprising:

capturing an image of a living tissue in which HER2 protein and cell nucleuses are dyed;

discriminating a dyed state of a cell membrane by identifying the cell membrane from the image of the living tissue based on dyed cell nucleuses within the captured image of the living tissue; and evaluating development of the HER2 protein based on the result of the discrimination.

10. The evaluation method according to claim 9, wherein said discriminating includes:

discriminating degree of dyeing of the HER2 protein for each pixel representative of dyed HER2 protein within the image of the living tissue;

detecting the dyed cell nucleus from the image of the living tissue;

identifying the cell membrane from the image of the living tissue based on the cell nucleus; and discriminating the dyed state of the cell membrane based on the degree of dyeing in a pixel corresponding to the cell membrane in each pixel whose degree of dyeing is discriminated.

11. The evaluation method according to claim 10, further comprising:

capturing information on a tumorous region in the image of the living tissue; and identifying the tumorous region from the image of the living tissue based on the information on the tumorous region, wherein said discriminating the degree of dyeing includes discriminating the degree of dyeing of the HER2 protein for each pixel that represents the dyed HER2 protein within the tumorous region, and said detecting includes detecting the dyed cell nucleus from the tumorous region.

12. The evaluation method according to claim 10 wherein:

said detecting includes detecting a cell nucleus of a tumorous cell from the image of the living tissue; and said discriminating the cell membrane degree of dyeing includes identifying the cell membrane of the tumorous cell from the image of the living tissue based on the cell nucleus of the tumorous cell, and discriminating the dyed state of the cell membrane of the tumorous cell based on the degree of dyeing in a pixel corresponding to the cell membrane of the tumorous cell in each pixel whose degree of dyeing is discriminated.

13. The evaluation method according to claim 11, further comprising:

extracting a dyed region that has the HER2 protein from the tumorous region to determine a proportion of the dyed region of the HER2 protein within the tumorous region; and discriminating a proportion at which the tumorous region is occupied by strongly dyed pixels whose degree of dyeing is equal to or more than a predefined reference value based on the pixels whose degree of dyeing is discriminated, wherein said detecting includes detecting the cell nucleus from the tumorous region when the proportion of the dyed region that has the HER2 protein is equal to or more than a predefined reference dyeing value within the tumorous region, and when the proportion of the strongly dyed pixels is less than a predefined reference strong-dyeing value within the tumorous region.

14. The evaluation method according to claim 12, further comprising:

extracting a dyed region that has the HER2 protein from the image of the living tissue to determine a proportion of the dyed region that has the HER2 protein within the image of the living tissue; and discriminating a proportion at which the image of the living tissue is occupied by strongly dyed pixels whose degree of dyeing is equal to or more than a predefined reference value, based on pixels whose degree of dyeing is discriminated, wherein said detecting includes detecting the cell nucleus of the tumorous cell from the image of the living tissue when the proportion of the dyed region that has the HER2 protein is equal to or more than a predefined reference dyeing value within the image of the living tissue, and when the proportion of the strongly dyed pixels is less than a predefined reference strong-dyeing value within the image of the living tissue.

15. The evaluation method according to claim 9, further comprising outputting display data representative of an image which displays the dyed state of the cell membrane on the image of the living tissue.

16. A computer readable recording medium in which an evaluation program is recorded, said evaluation program causing a computer to execute:

a capture procedure for capturing an image of a living tissue in which HER2 protein and cell nucleuses are dyed;

a discrimination procedure for identifying a cell membrane from the image of the living tissue based on dyed cell nucleuses within the captured image of the living tissue to discriminate a dyed state of the cell membrane; and an evaluation procedure for evaluating development of the HER2 protein based on the result of the discrimination.

17. The recording medium according to claim 16, wherein said discrimination procedure includes:

a dyeing degree discrimination procedure for discriminating degree of dyeing of the HER2 protein for each pixel representative of dyed HER2 protein within the image of the living tissue;

a detection procedure for detecting the dyed cell nucleus from the image of the living tissue; and a cell membrane dyeing degree discrimination procedure for identifying the cell membrane from the image of the living tissue based on the cell nucleus, and discriminating the dyed state of the cell membrane based on the degree of dyeing in a pixel corresponding to the cell membrane in each pixel whose degree of dyeing is discriminated.

* * * * *